United States Patent
Denny et al.

(10) Patent No.: US 6,389,738 B1
(45) Date of Patent: May 21, 2002

(54) ALTERNATING RODENT INSECT TRAP

(75) Inventors: Scott D. Denny, Ypsilanti, MI (US); Rick Leyerle; Daniel C. Johnson, both of Madison, WI (US)

(73) Assignee: Bell Laboratories, Inc., Madison, WI (US)

(*) Notice: Subject to any disclaimer, the term of this patent is extended or adjusted under 35 U.S.C. 154(b) by 0 days.

(21) Appl. No.: 09/821,494

(22) Filed: Mar. 29, 2001

(51) Int. Cl.[7] .............................................. A01M 1/10
(52) U.S. Cl. ......................................................... 43/58
(58) Field of Search ............................ 43/60, 114, 121, 43/136, 131, 132.1, 58

(56) References Cited

U.S. PATENT DOCUMENTS

| | | |
|---|---|---|
| 2,764,840 A | 10/1956 | Mayfield |
| 4,228,613 A | 10/1980 | Kalnasy et al. |
| 4,349,982 A | 9/1982 | Sherman |
| 4,395,842 A | 8/1983 | Margulies |
| 4,453,337 A | 6/1984 | Williams |
| 4,483,095 A | 11/1984 | Webinger |
| 4,611,426 A | 9/1986 | Willis |
| 4,658,536 A | 4/1987 | Baker |
| 5,022,180 A | 6/1991 | Alabese |
| 5,272,832 A | 12/1993 | Marshall et al. |
| 5,446,992 A | 9/1995 | Stewart |
| 5,771,628 A * | 6/1998 | Nobbs .......................... 43/121 |
| 5,806,237 A | 9/1998 | Nelson et al. |
| 5,857,286 A | 1/1999 | Doucette |
| 5,930,944 A | 8/1999 | Knuppel |
| 5,943,817 A * | 8/1999 | Miller .......................... 43/131 |
| 5,966,863 A | 10/1999 | Payton et al. |
| 6,202,339 B1 | 3/2001 | Knuppel |
| 6,266,917 B1 * | 7/2001 | Hight .......................... 43/114 |

FOREIGN PATENT DOCUMENTS

DE          25 24 514          12/1976

OTHER PUBLICATIONS

Bell Laboratories Pest Monitor, Bell Laboratories, Inc., Madison, WI, 1998.

* cited by examiner

*Primary Examiner*—Thomas Price
*Assistant Examiner*—Kevin Jakel
(74) *Attorney, Agent, or Firm*—Lathrop & Clark LLP

(57) ABSTRACT

A pest trap has a cover which engages with a base in two alternative positions. The cover has rodent access openings on opposed side walls which, in a first position, align with openings of similar dimensions in the opposed side walls of the base; and in a second position, when the cover is rotated 180°, align with solid portions of the base side walls to block the rodent access openings. A glue board within the base allows it to be used for trapping rodents and insects, or insects alone. The cover has tabs which pivot in base tab holes, and prongs which engage with base ledges to secure the cover to the base. The cover may have interior board restraint fingers which help to retain the glue board in a flat condition. A rod may support a bait block over a tray in place of the glue board.

21 Claims, 3 Drawing Sheets

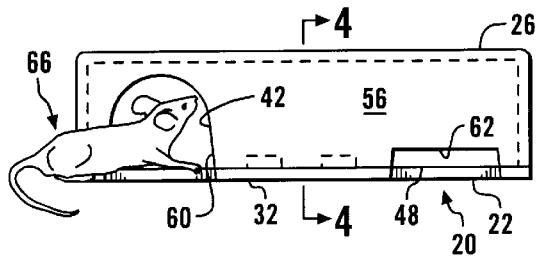
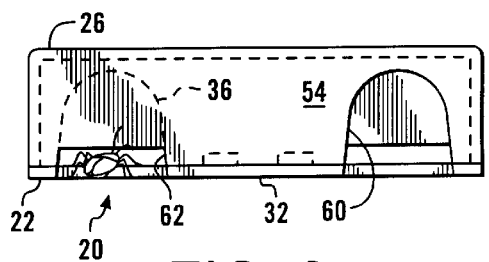
FIG. 2    FIG. 3
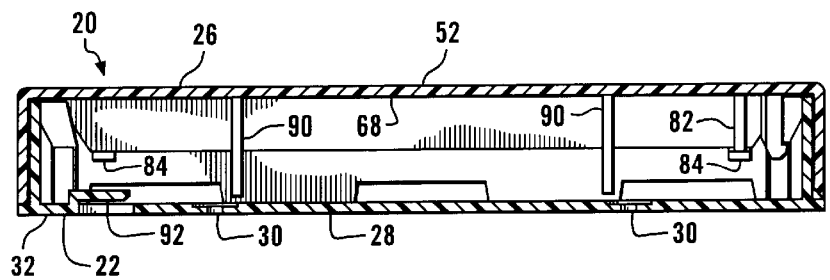
FIG. 4
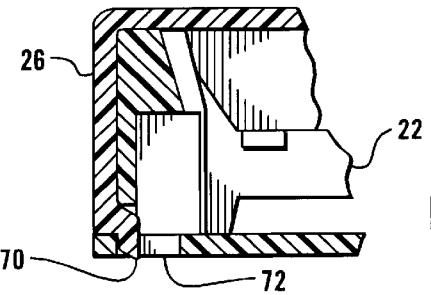
FIG. 5
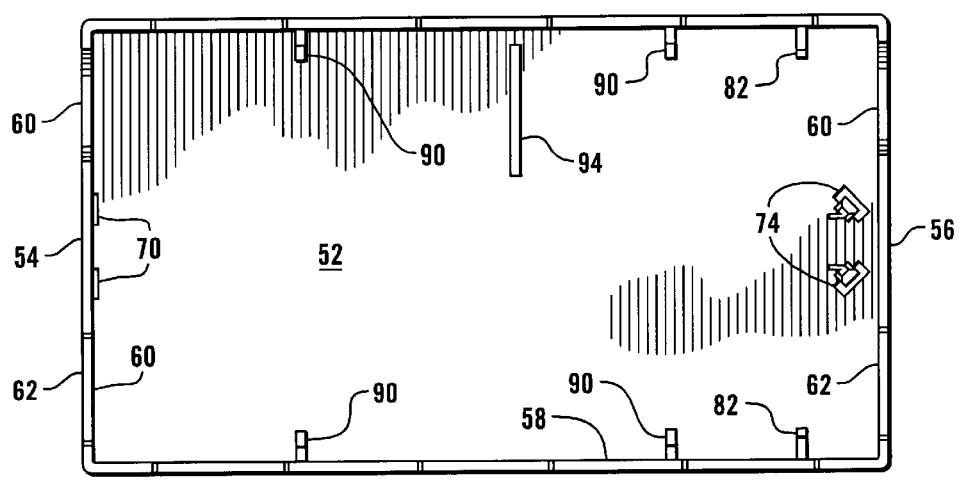
FIG. 6

ALTERNATING RODENT INSECT TRAP

CROSS REFERENCES TO RELATED APPLICATIONS

Not applicable.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to pest traps in general, and more particularly to traps which can selectably admit or block the access of non-insect pests.

Before a pest infestation of a facility can be treated, it is desirable to make an assessment of the quantity and kind of pests which are presenting a problem. A pest monitor is a trap which not only kills a variety of pests, but also retains them for analysis. Such a trap may be used during the initial diagnostic stage to determine the species of insect or rodent which needs to be combated, or, throughout the course of treatment, the monitor can assist the pest control operator (PCO) in determining the level of continued infestation.

In some circumstances small rodents such as mice may be the biggest concern, while in other circumstances insects are the problem. If the mouse population is of little importance, and insects are targeted, it may be desirable to prevent the capture of small animals such as shrews and voles. Shrews, for example, although in many circumstances about the same size as mice, also consume a large quantity of undesirable insects. A shrew has a high metabolic rate and is capable of consuming more than its own weight in food each day. Thus, where insect infestation is a problem, shrew and vole populations can be an important ally in reducing insect levels—thus it is important not to trap the shrews and voles in such a situation. On the other hand, it is frequently the occasion that insects are less of a problem than rodents, in which case it is desirable to trap small animals such as mice.

Adhesive glue boards have been used to trap insects and rodents. Moreover, enclosures have been developed to contain glue boards and permit the entrance of rodents and insects simultaneously. However, what is needed is a single trap which may be readily configured to either exclude or accept small animals, while always admitting insects.

SUMMARY OF THE INVENTION

The pest trap of this invention has a cover with downwardly extending side walls which engages with the upwardly extending side walls of a base in two alternative positions. The cover has rodent access openings on opposed side walls which, in a first position, align with openings of similar dimensions in the opposed side walls of the base; and in a second position, when the cover is rotated 180°, align with solid portions of the base side walls to block the rodent access openings. An adhesive coated glue board is positioned within the base. The trap may thus be used either for trapping rodents and insects, or for trapping insects alone. One of the cover side walls has downwardly extending tabs which pivot within tab holes in the base. The cover has downwardly extending prongs which engage with a pair of ledges on one of the base side walls to secure the cover to the base. The cover may have interior board restraint fingers which help to retain the glue board in a flat condition. In an alternative embodiment a tray may be positioned within the base in place of the glue board and one or more bait blocks supported on a rod above the tray.

It is a feature of the present invention to provide a glue board trap which may be manipulated to exclude or admit rodents.

It is another feature of the present invention to provide an assembly which may be adjusted to exclude rodents, or to admit rodents either to a rodenticide dispensing area or to a glue trap.

It is also a feature of the present invention to provide a glue board trap which admits insects.

Further objects, features and advantages of the invention will be apparent from the following detailed description when taken in conjunction with the accompanying drawings.

BRIEF DESCRIPTION OF THE DRAWINGS

FIG. 2 is an end view of the trap of FIG. 1 configured to admit rodents.

FIG. 3 is an end view of the trap of FIG. 1 configured to exclude rodents.

FIG. 4 is a cross-sectional view of the trap of FIG. 2 taken along section line 4—4.

FIG. 5 is a fragmentary cross-sectional view of the trap of FIG. 2, taken through the connected tab and tab holes.

FIG. 6 is plan view of the underside of the lid of the trap of FIG. 1.

DESCRIPTION OF THE PREFERRED EMBODIMENTS

Referring more particularly to FIGS. 1–7, wherein like numbers refer to similar parts, a pest trap 20 is shown in FIGS. 1–5. The trap 20 has a molded plastic base 22 which receives a glue board 24 and which is covered by a molded plastic cover 26. The base is an upwardly opening rectangular box, and the cover is a downwardly opening rectangular box which is superpositionable over the base. The cover 26 may be snapped into engagement with the base 22 in two alternative positions: one in which rodent-sized openings in the base and cover side walls are aligned, and one in which the openings are not aligned to thereby alternatively admit rodents into the trap, and to restrict entrance of rodents into the trap. In both positions, narrow insect openings permit the entrance of insects into the trap and onto the glue board.

Figure 1:
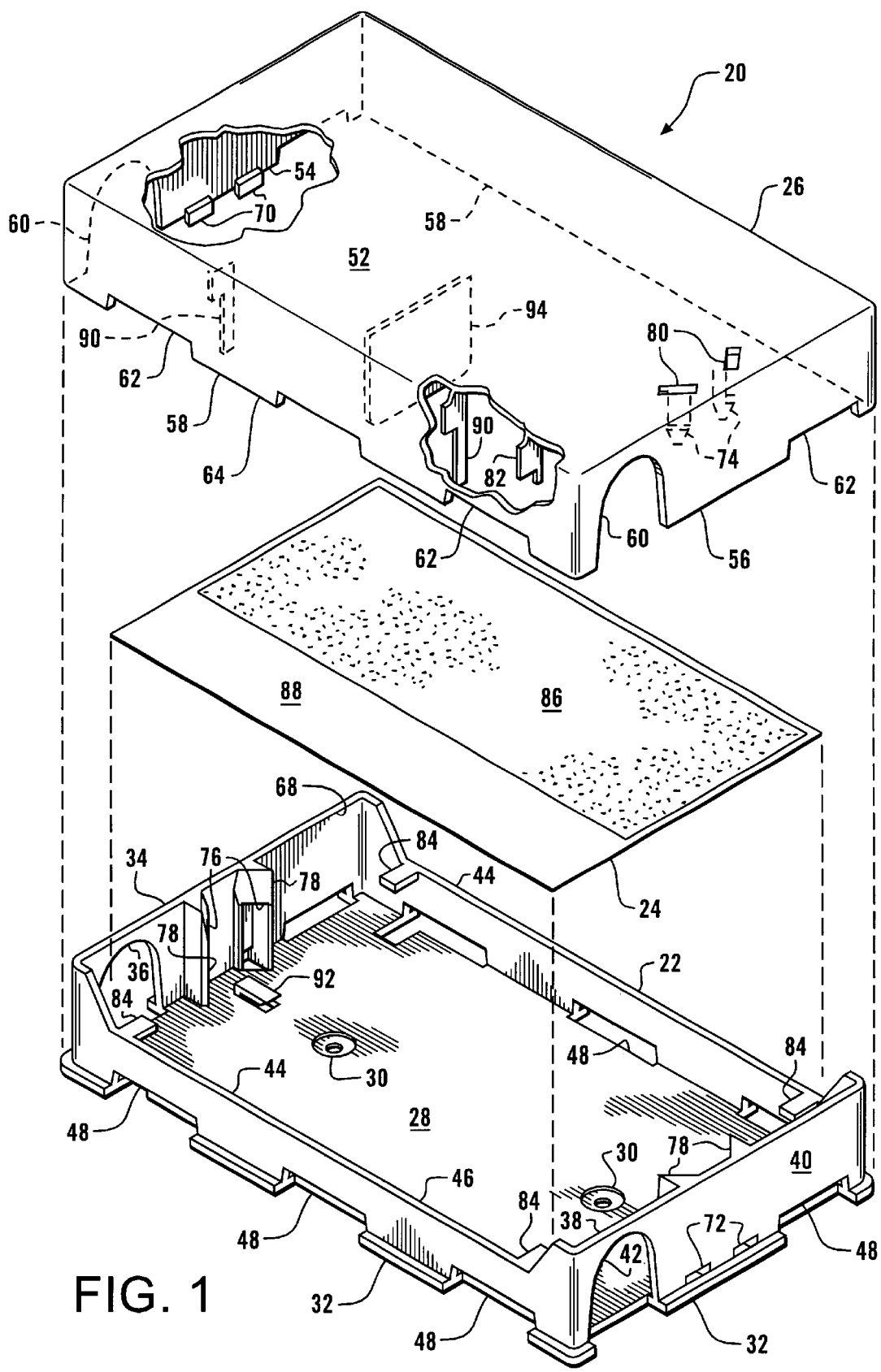
FIG. 1 is an exploded isometric view of a trap which may alternatively be configured to admit insects and rodents, or to exclude rodents while admitting insects.

As shown in FIG. 1, the base 22 is an injection molded plastic part having a bottom wall 28 which extends horizontally for positioning on a support surface such as a building floor or the ground. The bottom wall 28 may be provided with one or more central fastener recesses 30 where the plastic is thinner to permit screws or nails to be driven through the bottom wall to fix the trap 20 in place.

The base 22 has four side walls which extend upwardly from the bottom wall 28 and which are approximately perpendicular to the bottom wall. The bottom wall 28 extends outwardly beyond the side walls to define a peripheral flange 32. The base 22 has a first side wall 34 which has an arched rodent access opening 36 which extends from the flange 32 to a position closely spaced from the top edge 38 of the first side wall. The first rodent access opening 36 is approximately one inch tall and one inch wide. The base 22 is symmetrical about a reference plane which extends perpendicular to the bottom wall 28 and which is parallel to and positioned half way between the first side wall 34 and an opposed second side wall 40 which extends upwardly from the bottom wall and which also has formed therein a rodent access opening 42.

Two parallel intermediate side walls 44 extend between the first side wall 34 and the second side wall 40. The intermediate side walls 44 are the same height as the first side wall and second side wall 34, 40 where they engage those side walls, but taper to about one half that height along an intermediate edge 46. In addition to the rodent access openings 36, 42, insect openings 48 are formed along the lower edges of the side walls. Each insect opening 48 is comprised of a vertically extending relieved portion of a side wall and an inwardly extending relieved portion of the bottom wall 28. The flange 32 is also relieved adjacent each insect opening 48. The insect openings 48 are less about one-quarter the height of the rodent access openings and are selected to be of a height which is too small to permit the entrance of a rodent.

The cover 26 has a top wall 52 which is spaced above and is generally parallel to the bottom wall 28. The cover 26 has a first side wall 54 and a second side wall 56 which are connected by parallel intermediate side walls 58. All four side walls are the same height. The distance between the side walls of the cover is selected to permit the cover 26 to engage with the base 22 such that the exterior faces of the cover side walls align with the exterior perimeter of the base flange 32. The cover first side wall 54 and second side wall 56 each have a rodent access opening 60 formed therein. The cover rodent access openings 60 are preferably identical to the base rodent access openings 36, 42. Insect openings 62 are formed along the lower edge 64 of the cover and are the same size as the insect openings formed on the base side walls.

The cover 26 is symmetrical about a reference plane parallel to the first cover side wall 54 which bisects the cover. Moreover, except for the positioning of the rodent access openings 60 and the insect openings 62, the cover is symmetrical about a reference plane which is parallel to the cover intermediate side walls 58 which bisects the cover. The cover rodent access openings 60 are positioned on the same side of this last reference plane. Because of the symmetries of the base and the cover, the cover may be attached to the base in two orientations. In the first orientation, shown in FIG. 1 and FIG. 2, the rodent access openings 60 on the cover side walls 54, 56 are aligned with the rodent access openings 36, 42 of the base side walls 34, 40. In this orientation, as shown in FIG. 2, a rodent such as a mouse 66 may pass through the aligned rodent access openings into the interior 68 of the trap 20.

In the second orientation, shown in FIG. 3, the cover is rotated 180° from its position in the first orientation. In this position, the cover rodent access openings 60 are no longer positioned alongside the base rodent access openings but are instead of positioned alongside the blank side walls 34, 40 at the solid regions above the insect openings 48. In the second orientation the cover rodent access openings do not significantly block the insect openings 48 in the base side walls 34, 40; while the insect openings 62 in the cover 26 first side wall 54 and second side wall 56 are aligned with the rodent access openings 36, 42 of the base, permitting continued insect access to the interior 68 of the trap 20.

The trap 20 forms an enclosure primarily to prevent access to the glue board 24 by children, pets, and other non-targeted species. Therefore it is desirable that the cover 26 be secured to the base 22 so that only authorized persons, such as a pest control operator, can have access to the trap interior 68. As shown in FIGS. 1 and 5, a single pair of tabs 70 extend downwardly from the cover first side wall 54. The tabs 70 may be selectably engaged in a pair of tab holes 72 formed in the base first side wall and bottom wall, or a similar pair formed in the base second side wall and bottom wall.

To assemble the cover 26 to the base 22, the cover is tilted at an acute angle with respect to the base, and the cover tabs 70 are inserted into the base tab holes 72. The cover is then pivoted and closed onto the base. As shown in FIG. 1 and FIG. 4, the cover 26 is secured to the base 22 by two downwardly protruding prongs 74 which are releasably engageable with two mating ledges 76 which are positioned inwardly from the base first side wall or base and second side wall on inwardly protruding projections 78. The resilient prongs 74 permit the cover to be locked to the side wall, thereby preventing opening without a key, in a fashion similar to the locking structures disclosed in U.S. Pat. No. 5,040,327, the disclosure of which is incorporated herein by reference. As shown in FIG. 1, identical projections 78 and ledges 76 are formed adjacent the base second wall 40. To release the cover from the base 22, a forked key is inserted through two slots 80 formed in the cover top wall adjacent the prongs 74. The forked key, not shown, has two projections which displace the prongs 74 to drive them out of engagement with the ledges 76.

To assist the separation of the cover 26 from the base 22 upon actuation of the key, the cover may be provided with downwardly extending members 82 which engage with tab-like spring members 84 which extend inwardly from the upper edge 46 of the intermediate side walls 44 of the base. As shown in FIG. 1 and FIG. 4, the cover members 82 engage with and depress the molded plastic spring members 84 on the base when the cover is secured to the base. Spring members 84 are positioned adjacent both the first side wall and the second side wall of the base so that the spring effect will be provided for both orientations of the cover. The resilience of the plastic spring members 84 is such that, upon release of the prongs 74 from the ledges 76, the cover members 82 are driven upwardly such that the cover is elevated slightly above the base flange 32 making it easier for a user to engage the cover and remove it fully from the base.

The glue board 24, as shown in FIG. 1, is a rectangular sheet or card of paper or plastic to which a region of adhesive 86 has been applied. The adhesive region 86 remains tacky over time and will engage and retain insects and rodents which pass over it. A nonadhesive walkway 88 is preferably defined alongside the adhesive region 86. The walkway 88 extends between the two rodent access openings in the base and thereby permits rodents to enter the interior 68 of the trap 20 prior to becoming caught on the adhesive region 86.

The glue board 24 is restrained at one edge by a hook 92 which extends upwardly from the bottom wall 28 of the base 22 and has portions which extend parallel to the bottom wall. The glue board 24 is restrained from twisting or warping by four downwardly extending board restraint fingers 90. The restraint fingers 90, as shown in FIG. 1 and FIG. 4 extend downwardly from the cover 26 top wall 52 past the base intermediate walls to a position closely spaced from the bottom wall 28 when the cover is closed on the base. As shown in FIG. 1, a barrier 94 extends downwardly from the cover top wall 52 across the walkway 88, directing rodents off the walkway onto the adhesive region 86 of the glue board 24.

The operation of the multipurpose trap 20 is shown in FIG. 2 and FIG. 3. The pest control operator may carry a quantity of traps 20 for usage in a variety of situations. Where it is desired to trap rodents such as mice 66, the user positions the cover with respect to the base so that the rodent access openings, both of which are on the same side of a reference plane which bisects the trap, align with one another. When, as shown in FIG. 3, the user desires to exclude larger pests such as rodents, the cover is attached to the base such that the rodent access openings of the cover do not align with the rodent access openings of the base thereby preventing either side rodent access openings from being fully accessible. The user may thus determine at the time of use whether to exclude rodents or not from the trap.

Figure 7:
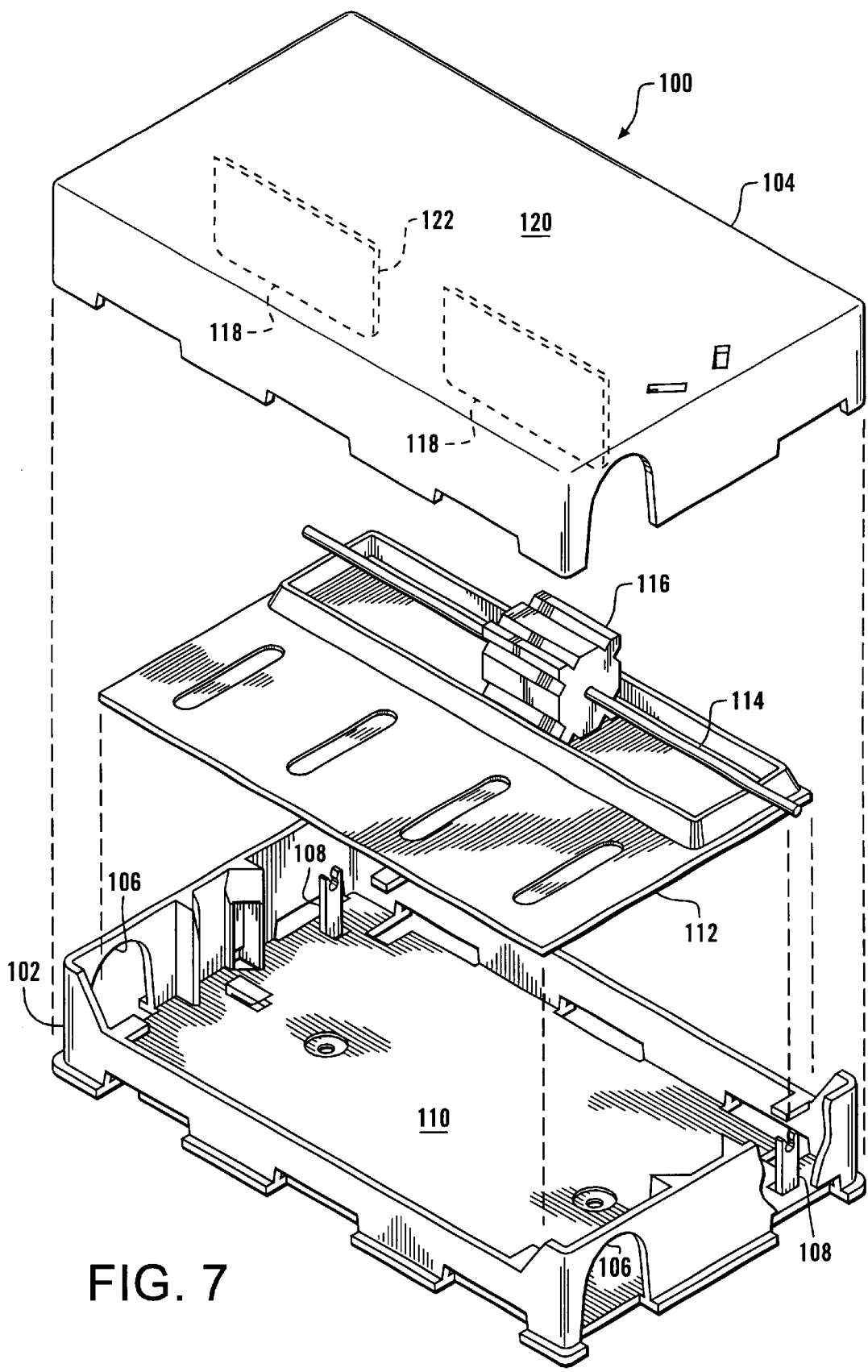
FIG. 7 is an alternative embodiment trap of this invention which in addition to being readily configurable to exclude or admit rodents, is also capable of being configured to serve as a bait station for rodents and insects.

An alternative embodiment trap 100 is shown in FIG. 7 which may be used either as a glue board trap are as a rodenticide and/or insecticide dispensing bait station or as a glue board trap as discussed above. The trap 100 has a base 102 with a cover 104 having rodent access openings 106 substantially as discussed above. To facilitate the use of the trap 100 as a rodent bait station, two rod holding segments 108 extend upwardly from the bottom wall 110 of the base 102. A thin sheet disposable tray 112 is received on the bottom wall 110 between the two rod holding segments 108. A narrow metal rod 114 extends between the rod holding segments 108, and is removably received in a snap-fit with the rod holding segments. A rodent bait block 116 may be supported on the rod 114 above the tray 112. To restrict access to the bait block 116 by children, two barriers 118 extend downwardly from the top wall 120 of the cover 104. The rodent, however may pass through a gap 122 defined between the two barriers 118 to reach the bait. Alternatively, insecticide pellets may be positioned within the tray 112. With the trap 100, the user may choose to position it for use as a rodent glue trap, a rodent bait station, an insecticide station, or as a rodent-excluding glue trap, depending upon the orientation of the cover with respect to the base, and whether the tray and rod are positioned within.

It should be noted that, although a rectangular cover and base have been illustrated, other shapes permitting alternative positioning may also be employed.

It is understood that the invention is not limited to the particular construction and arrangement of parts herein illustrated and described, but embraces such modified forms thereof as come within the scope of the following claims.

We claim:

1. A pest trap comprising:
a base having a bottom wall, and side walls which extend upwardly from the bottom wall, to define a trap interior within the side walls and above the bottom wall;
portions of the base side walls which define a plurality of insect openings extending above the bottom wall, each insect opening having a minimum dimension of a first level;
portions of the base side walls which define a rodent access opening which communicates with the trap interior;
a cover having a top wall and side walls which extend downwardly from the top wall, the cover engageable with the base in a first position, and in a second alternate position;
portions of the cover side walls which define a plurality of insect openings;
portions of the cover side walls which define a rodent access opening, wherein in the cover first position, the cover top wall overlies the base bottom wall and is spaced above the base bottom wall, and wherein portions of the cover rodent access opening extend along the portions of the base rodent access opening to define a combined access opening communicating between the trap interior and a region exterior to the trap, and wherein in the second alternate position, portions of the cover rodent access opening extend along solid portions of the base side walls to block admission of rodents therethrough, wherein in the second alternate position portions of the cover insect openings extend along the base access openings to communicate between the trap interior and the region exterior to the trap.

2. The pest trap of claim 1 further comprising:
a glue board disposed on the base bottom wall; and
a least one restraint finger which extends downwardly from the cover top wall into proximity with the glue board when the cover is closed on the base, to thereby restrict the upward displacement of the glue board.

3. The pest trap of claim 1 further comprising:
portions of the cover which engage with the base to secure the cover to the base;
at least one spring member extending inwardly from the base side walls; and
at least one member protruding downwardly from the cover top wall and depressing the at least one spring member when the cover is secured with the base, such that release of the cover from the base causes the at least one spring member to exert an upwardly directed force on the cover.

4. The pest trap of claim 1 further comprising:
first rod holding segment extending upwardly from the base bottom wall;
a second rod holding segment extending upwardly from the base bottom wall; and
a rod which extends between the first rod holding segment and the second rod holding segment, the rod being supported spaced above the base bottom wall, and below the cover top wall.

5. The pest trap of claim 4 further comprising a removable tray disposed on the base bottom wall beneath the rod.

6. The pest trap of claim 1 further comprising:
at least one tab extending downwardly from a first side wall of said cover side walls;
at least one prong extending downwardly from the cover top wall at a position spaced from the cover first side wall;
portions of the base defining at least one first ledge which is engagable with the at least one prong to secure the cover to the base; and
portions of the base spaced from said at least one ledge which define a first slot which receives the at least one tab.

7. The pest trap of claim 6 further comprising:
portions of the base defining at least one second ledge spaced across the trap interior from the first ledge; and
portions of the base defining at least one second slot spaced across the trap interior form the first slot, wherein the cover at least one prong is alternatively engaged with either the at least one first ledge or the at least one second ledge depending on whether the cover is in the first cover position or in the cover second alternate position.

8. A pest trap comprising:

a base having a bottom wall, and a first base side wall and a second base side wall parallel to the first base side wall, and intermediate base side walls extending between the first base side wall and the second base side wall, the base side walls extending upwardly from the bottom wall generally perpendicular to the bottom wall, a trap interior being defined between the base side walls and above the bottom wall, wherein a first reference plane is defined which is perpendicular to the first base side wall, and which bisects the first base side wall and the second base side wall;

portions of the base side walls defining a plurality of insect access openings communicating with the trap interior;

portions of the first base side wall defining a first rodent access opening which communicates with the trap interior;

portions of the second base side wall defining a second rodent access opening which communicates with the trap interior, wherein the first rodent access opening and the second rodent access opening are on the same side of the first reference plane;

a cover having a top wall and a first base side wall, a second base side wall parallel to the first base side wall, and intermediate base side walls extending between the first base side wall and the second base side walls, the side walls extending downwardly from the top wall, such that the top wall is spaced above the bottom wall, and the cover side walls are positioned alongside the base side walls;

portions of the cover defining at least one insect opening;

portions of the first cover side wall defining a first rodent access opening; and portions of the second cover side wall defining a second rodent access opening, wherein the cover first rodent access opening and the cover second rodent access opening are on the same side of the first reference plane, and wherein the cover is engageable with the base in a first position, in which the cover rodent access openings and the base rodent access openings are all on the same side of the first reference plane, such that portions of the cover rodent access openings are aligned with portions of the base rodent access openings to define combined rodent access openings which communicate between the trap interior and a trap exterior, and a second alternate position in which the cover access openings are on one side of the first reference plane, and the base access openings are on the opposite side of the first reference plane and portions of the cover access openings are blocked by solid regions of the base side walls, and wherein one of the plurality of base insect openings communicates with the at least one cover insect opening in both the cover first position and the cover second position.

9. The pest trap of claim 8 further comprising:

a glue board disposed on the base bottom wall; and a least one restraint finger which extends downwardly from the cover top wall into proximity with the glue board when the cover is closed on the base, to thereby restrict the upward displacement of the glue board.

10. The pest trap of claim 8 further comprising:

portions of the cover which engage with the base to secure the cover to the base;

at least one spring member extending inwardly from the base side walls; and at least one member protruding downwardly from the cover top wall and depressing the at least one spring member when the cover is secured with the base, such that release of the cover from the base causes the at least one spring member to exert an upwardly directed force on the cover.

11. The pest trap of claim 8 further comprising:

a first rod holding segment extending upwardly from the base bottom wall;

a second rod holding segment extending upwardly from the base bottom wall; and a rod which extends between the first rod holding segment and the second rod holding segment, the rod being supported spaced above the base bottom wall, and below the cover top wall.

12. The pest trap of claim 11 further comprising a removable tray disposed on the base bottom wall beneath the rod.

13. The pest trap of claim 8 further comprising:

at least one tab extending downwardly from the cover first side wall;

at least one prong extending downwardly from the cover top wall at a position spaced from the cover first side wall;

portions of the base defining at least one first ledge which is engagable with the at least one prong to secure the cover to the base; and portions of the base spaced from said at least one ledge which define a first slot which receives the at least one tab.

14. The pest trap of claim 13 further comprising:

portions of the base defining at least one second ledge projecting from the base second side wall; and portions of the base defining at least one second slot spaced across the trap interior form the first slot, wherein the cover at least one prong is alternatively engaged with either the at least one first ledge or the at least one second ledge depending on whether the cover is in the first cover position or in the cover second alternate position.

15. A pest station containing pest bait, or a glue trap, comprising:

a first upwardly opening rectangular box, the box having upwardly extending side walls, portions of the side walls forming a first plurality of insect openings, and additional portions forming first rodent access openings;

a second downwardly opening rectangular box, superpositionable upon the first upwardly opening rectangular box, the second box having downwardly extending side walls, portions of the downwardly extending side walls defining a second plurality of insect openings, and additional portions forming second rodent access openings, wherein the second downwardly opening rectangular box is superpositionable on the first upwardly opening rectangular box in a first orientation wherein the portions of the downwardly extending side walls defining the second plurality of insect openings are aligned with the first plurality of insect openings, and the additional portions forming second rodent access openings are aligned with the additional portions forming first rodent access openings in the first upwardly opening rectangular box to allow insects and rodents to pass into a volume defined between the first rectangular box and the second rectangular box, the second downwardly opening rectangular box being further superpositionable on the first upwardly opening rectangular box in a second orientation wherein portions of the downwardly extending side walls defining the second plurality of insect openings are aligned with the first plurality of insect openings in the side walls of the first upwardly opening rectangular box, but the additional portions forming second rodent access openings, are not aligned with the additional portions forming the first rodent access openings in the side walls of the first upwardly opening rectangular box, so that insects can enter the volume defined between the first upward opening rectangular box and the second downwardly opening rectangular box but rodents cannot.

16. The pest station of claim 15 further comprising:

a glue board disposed within the first rectangular box; and a least one restraint finger which extends downwardly from the second rectangular box into proximity with the glue board when the second box is closed on the first box, to thereby restrict the upward displacement of the glue board.

17. The pest station of claim 15 further comprising:

portions of the second rectangular box which engage with the first rectangular box to secure the boxes together;

at least one spring member extending inwardly from the first box side walls; and at least one member protruding downwardly from the second box and depressing the at least one spring member when the second box is secured with the first box, such that release of the second box from the first box causes the at least one spring member to exert an upwardly directed force on the second box.

18. The pest station of claim 15 further comprising:

a first rod holding segment extending upwardly from the first box;

a second rod holding segment extending upwardly from the first box; and a rod which extends between the first rod holding segment and the second rod holding segment.

19. The pest trap of claim 18 further comprising a removable tray disposed within the first box beneath the rod.

20. The pest trap of claim 15 further comprising:

at least one tab extending downwardly from the one of the second box side walls;

at least one prong extending downwardly from the second box at a position spaced from said at least one tab;

portions of the first box defining at least one first ledge which is engagable with the at least one prong to secure the second box to the first box; and portions of the first box spaced from said at least one ledge which define a first slot which receives the at least one tab.

21. The pest trap of claim 20 further comprising:

portions of the first box defining at least one second ledge projecting from a first box side wall spaced across the first box from the first ledge; and portions of the base defining at least one second slot spaced across the first box form the first slot, wherein the second box at least one prong is alternatively engaged with either the at least one first ledge or the at least one second ledge depending on orientation of the second box with respect to the first box.

* * * * *